United States Patent [19]
Rotermund et al.

[11] Patent Number: 5,916,480
[45] Date of Patent: Jun. 29, 1999

[54] STORAGE-STABLE EMULSIONS FOR PRODUCING FINE-CELLED RIGID FOAMS BASED ON ISOCYANATE

[75] Inventors: Udo Rotermund, Ortrand; Marion Heinz, Bernsdorf; Anja Biedermann, Senftenberg; Renate Hempel, Ruhland; Werner Wiegmann, Rahdem, all of Germany

[73] Assignee: BASF Aktiengesellschaft

[21] Appl. No.: 09/159,976

[22] Filed: Sep. 24, 1998

[30] Foreign Application Priority Data

Sep. 24, 1997 [DE] Germany ............... 197 42 010

[51] Int. Cl.$^6$ .............. C08G 18/34; C08K 3/00
[52] U.S. Cl. .............. 252/182.24; 252/182.25; 252/182.28; 521/174
[58] Field of Search ............ 252/182.24, 182.25, 252/182.28; 521/174

[56] References Cited

U.S. PATENT DOCUMENTS

| 4,637,893 | 1/1987 | Reichel et al. | 521/174 |
| 4,642,267 | 2/1987 | Creasy et al. | 521/174 |

*Primary Examiner*—Morton Foelak
*Attorney, Agent, or Firm*—Fernando A. Borrego

[57] ABSTRACT

Blowing agent-containing emulsions comprise
 a) compounds containing hydrogen atoms which are reactive toward isocyanates,
 b) blowing agents,
 c) catalysts, auxiliaries and/or additives which are customary in polyurethane chemistry, wherein the blowing agents b) are present as an emulsion in the components a) and c), and polyester alcohols having the following structure are used as emulsification aids:

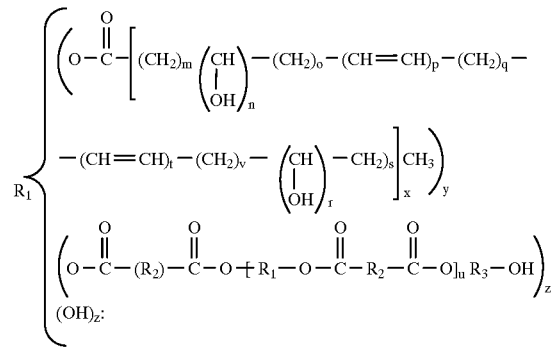

where
 $m=0-15$
 $n=0-1$
 $o=0-15$
 $p=0-1$
 $q=0-15$
 $r=0-1$
 $s=0-15$
 $t=0-1$
 $u=0-10$
 $v=0-15$
 $x=1-5$
 $y=1-4$ or mixtures of 1–3 where $r+n\neq 0$
 $z=0-3$
 $z_i=0.1-3$
 $R_1$ is an aliphatic structure without OH groups, based on the structure of polyhydric alcohols, preferably ethylene glycol, diethylene glycol, triethylene glycol, 1,2-propylene glycol and dipropylene glycol, 1,4-butanediol, 1,6-hexanediol, neopentyl glycol, 1,3-butanediol, trimethylolpropane, trimethylol ethane, glycerol, pentaerythritol, where these substances can also be used as any mixture with one another in the esterification and $R_1$ can therefore also be a mixture of the corresponding structures,
 $R_2$ is the radical of a polycarboxylic acid without COOH groups, eg. adipic acid, terephthalic acid, o-phthalic acid,
 $R_3$ is an alcohol radical like $R_1$.

10 Claims, No Drawings

STORAGE-STABLE EMULSIONS FOR PRODUCING FINE-CELLED RIGID FOAMS BASED ON ISOCYANATE

The present invention relates to storage-stable CFC-free emulsions for producing open-celled and closed-celled rigid foams based on isocyanate.

The invention also relates to hydrogen-active compounds as emulsification aids for preparing these emulsions for producing open-celled and closed-cells rigid foams based on isocyanate.

The production of rigid foams based on isocyanate as thermal insulation material has been known for a long time. The most important chemical starting materials are polyfunctional isocyanates. As chemical structures formed from these polyisocyanates, it is possible for polyurethanes, polyureas, polyisocyanurates and also further isocyanate adducts such as allophanates, biurets, carbodiimides and their isocyanate adducts, oxazolidones, polyimides, polyamides etc., to be present.

The type of these structures is controlled by the reaction partners of the isocyanates, the catalysis and the reaction conditions. These isocyanate adducts are generally summarized under the term polyurethanes, since the polyurethanes are the most important and most widespread group of materials among the polyisocyanate adducts. Rigid foams based on isocyanate are therefore also called rigid polyurethane (PUR) foams. In the case of a significant proportion of isocyanurate structures, these foams are also referred to as rigid polyurethane/polyisocyanurate foams, rigid PUR/PIR foams or simply rigid PIR foams for short. The production of such rigid foams is described, for example, in the Kunststoff-Handbuch, Volume VII, Polyurethane, edited by G. Oertel, Carl Hanser Verlag, Munich, Vienna 1993.

The majority of these foams have hitherto been largely closed-celled. These rigid foams are since recently also being used as cores for vacuum insulation units and for this application have to be completely or virtually completely open-celled.

EP 351 614 describes the preparation of storage-stable emulsions comprising liquid, perfluorinated compounds which are sparingly soluble or insoluble in the polyurethane formative components as blowing agents and open-celled foams manufactured therefrom.

DE 4 143 148 describes the production of rigid foams based on isocyanate using a blowing agent mixture comprising isoalkanes having 6 or more carbon atoms and low-boiling fluorinated or perfluorinated organic compounds present together in the form of an emulsion. DE 42 00 558 describes the combination of fluorine comounds with $C_4$–$C_8$-hydrocarbons including cyclopentane. DE 41 21 161 too describes blowing agent-containing emulsions comprising fluorinated compounds.

These foams, also known as "emulsion foams", have very small cells which lead to low thermal conductivity. An important prerequisite for producing these emulsions is the use of at least one highly fluorinated or perfluorinated organic compound, preferably together with other blowing agents, eg. the hydrocarbons consisting of only hydrogen and carbon, as blowing agent mixture.

Thus, according to DE 42 00 558, a blowing agent mixture consisting of from 5 to 40% by weight of highly fluorinated and/or perfluorinated organic compounds, in particular hydrocarbons, from 30 to 95% by weight of cyclopentane and from 0 to 45% by weight of aliphatic and/or further cycloaliphatic hydrocarbons can be used for producing closed-celled rigid polyurethane foams at water contents of from 0.5 to 3% by weight. This gives a very fine-celled foam having a low thermal conductivity.

Furthermore, the use of highly fluorinated or perfluorinated organic compounds for producing open-celled emulsion foams for vacuum technology is described in EP 405 439, WO 96/25455, U.S. Pat. No. 5,346,928 or EP 662 494 or in WO 95/15355 as well as in WO 95/15356 in combination with carbon black. JP 081 7 551 recommends use of a very small amount of these highly fluorinated or perfluorinated organic compounds in closed-celled foams.

JP 08 104 771 describes the use of fluorine-containing surface-active substances, for example fluorinated alkyl esters.

WO 95/02620 likewise describes the production of fine-celled and open-celled emulsion foams for vacuum technology which are produced with the aid of an inert, insoluble organic liquid which is present as disperse phase in a micro-emulsion. In the examples, this liquid again comprises highly fluorinated or perfluorinated compounds. In EP 599 496, insoluble fluorinated compounds are likewise added as constituent of an emulsion.

EP 543 536 too recommends emulsion formation using an organic liquid which is insoluble in the reaction mixture. In the examples, this liquid is again represented by partially fluorinated or perfluorinated compounds. In WO 93/07201 too, emulsion formation is carried out using, for example, perfluoropentane.

The series of documents describing the use of fluorine compounds in emulsions for producing rigid foams based on isocyanate does, however, indicate the importance of the emulsions and the corresponding fluorine compounds for producing fine-celled foams.

Although the ozone depletion potential (ODP) of these mixtures is, compared to the previously used chlorofluorocarbons (CFCs), now zero, the fluorine compounds still contribute considerably to the global warming potential (GWP). In addition, according to M.C. BOGDAN et al. "Proceedings of Polyurethanes EXPO'96, SPI, Las Vegas, Nev., pp. 394–403, the fluorine compounds decompose once they get into the atmosphere to form acidic and environmentally harmful decomposition products, especially hydrogen fluoride.

Similar considerations also apply to blowing agents containing other halogens which in future should no longer be present in the rigid foams based on isocyanate.

A close-celled emulsion foam without halogen is described in EP 394 769. Use is made of polyesterol, a commercial emulsifier and finely divided nitrogen as emulsification aid.

Of course, such an emulsion foam without halogen still contains very small amounts of chlorine compounds which are formed in the synthesis of the isocyanate but cannot get into the atmosphere. However, a foam containing these traces of chlorine compounds will hereinafter be considered as halogen-free.

An emulsion foam without halogen is described, for example, in JP 08 193 115. An essential aspect of that disclosure is the simultaneous use of polyester alcohol and a prepolymer derived from isocyanate and polyether alcohol. DE 432 83 83 describes an only partially dissolved blowing agent composed of hydrocarbon which consists of only hydrogen and carbon or mixtures of such hydrocarbons having from 3 to 7 carbon atoms as emulsion in the polyol component. In that disclosure, polyethers containing oxyethylene groups together with polyethers which are free of oxyethylene groups are an essential aspect. However, the use of polyols containing oxyethylene groups in rigid foam formulations is known to increase the intrinsic reactivity of the formulation, so that less catalyst has to be used to set a desired fiber time. This results in the serious disadvantage that the reaction proceeds more slowly after reaching the fiber time and the foam cures significantly less well. This manifests itself, for example, in undesirably high demolding times when foaming is carried out in molds or in the need for lower working speeds in the double conveyor belt process. The solution described can only be used, if at all, to a very restricted extent and subject to this disadvantage.

DE 410 9 076 discloses a polyurethane/polyisocyanurate (PUR/PIR) foam blown with pentane and/or isopentane and having an isocyanate index above 200, in which halogen-free flame resistance of class B2in accordance with DIN 4102 is achieved as novelty. Benzyl n-butylphthalate or an OH-containing monofunctional polyether is used as emulsifier.

U.S. Pat. No. 5,488,071, U.S. Pat. No. 5,484,817 and U.S. Pat. No. 5,464,562 propose monofunctional polyoxyalkylene polyethers initiated using fatty alcohols having 8–24 carbon atoms as emulsifiers and polyesters in the polyol mixture.

DE 441 8 993 proposes the use of compounds based on castor oil as polyol component in rigid polyurethane foams. There, the castor oil is reacted with polyfunctional alkanols or amines and these reaction products serve as sole polyol component. Thus, for example, the esterification product of castor oil and glycerol having a hydroxyl number of 433 mg KOH/g is described and used as sole polyol in clear, transparent, non-emulsified A components for rigid polyurethane foams. The use as emulsification aid and rigid foams based on isocyanate (ie. both PUR and PUR/PIR foams) produced in this way is not described in DE 441 8 993.

All emulsions proposed hitherto have a series of disadvantages:

When using fluorine compounds as blowing agents, the blowing action is insufficient to produce open-celled foams having good flow behavior for vacuum technology. The simple filling of hollow spaces which are then merely evacuated is thus not possible.

Halogen-free open-celled foams having sufficiently small cells for vacuum technology have hitherto not been able to be produced at all.

Open-celled rigid foams which are blown only by means of the $CO_2$ formed by the reaction of water and isocyanate can thus not be produced. These foams are required, for example, for filling hollow spaces of refrigerators or other insulation units which are subsequently evacuated. If evacuation is, for example, carried out only in the household, only completely environmentally friendly blowing gases can be used, ie. even cyclopentane or other hydrocarbons are unsuitable for this purpose.

Previously known halogen-free emulsions for fine-celled and simultaneously closed-celled foams have an unsatisfactory shelf life. After only a few hours or at the latest after one or two days, demixing occurs. The fine-celled nature of the foams essential for use of the foams is thus a function of the storage time within technically necessary storage times of less than 12 hours. This greatly restricts the industrial handling of the previously known halogen-free emulsions for producing emulsion foams. In addition, the use of monofunctional emulsifiers which has previously been proposed for this purpose greatly reduces the total functionality of the polyol mixture and causes decreased crosslinking with all its associated disadvantages such as poorer curing of the reaction mixture or poorer thermal stability of the rigid foam produced therefrom. In the case of non-functional emulsifiers such as benzyl n-butylphthalate, the adhesion of the polyurethane to covering layers and the thermal stability, for example, are significantly worsened. In closed-celled rigid foams based on isocyanate and derived from halogen-free emulsions, the thermal conductivity is significantly higher than in the case of emulsions comprising halogen, especially fluorine, compounds.

When combined use is made of halogenated and halogen-free blowing agents, it is not possible to produce foams which are stable to very high temperatures, even where PUR/PIR structures are present.

It is an object of the present invention to prepare CFC-free emulsions for producing open-celled and closed-celled rigid foams based on isocyanate which do not have all these listed disadvantages.

We have found that this object is achieved by emulsions comprising the following constituents:

a) compounds containing reactive hydrogen atoms,
b) blowing agents and
c) auxiliaries and additives, wherein the blowing agent is emulsified in the component and polyester alcohols having the following structure are used as emulsification aids:

$$R_1 \left\{ \begin{array}{l} \left( O - \overset{O}{\underset{\|}{C}} - \left[ (CH_2)_m \left( \underset{OH}{\overset{|}{CH}} \right)_n - (CH_2)_o - (CH = CH)_p - (CH_2)_q - \right. \right. \\ \left. \left. - (CH = CH)_t - (CH_2)_v - \left( \underset{OH}{\overset{|}{CH}} \right)_r - CH_2 \right]_s CH_3 \right)_y \\ \left( O - \overset{O}{\underset{\|}{C}} - (R_2) - \overset{O}{\underset{\|}{C}} - O + R_1 - O - \overset{O}{\underset{\|}{C}} - R_2 - \overset{O}{\underset{\|}{C}} - O]_u R_3 - OH \right)_{z_1} \\ (OH)_{z_2} \end{array} \right.$$

I where:

$R^1$ is an aliphatic structure without hydroxyl groups based on the structure of polyhydric alcohols
m=0–15
n=0–1
o=0–15
p=0–1
q=0–15
r=0–1
s=0–15
t=0–1
u=0–10
v=0–15
x=1–5
y=1–4 or mixtures of 1–3 where r+n≠0
$z_1$=0–3
$z_2$=0–3
$z_1+z_2$=1–3.

The polyesterols of the formula I used according to the present invention as emulsification aids are preferably hydroxyl-containing esterification products of fatty acids and polyfunctional alcohols. It is possible here to use either saturated or unsaturated acids, with preference being given to using unsaturated compounds. Owing to the good compatibility with the other polyurethane formative components, preference is given to using reaction products of ricinoleic acid and/or castor oil and/or tall oil fatty acid with polyfunctional alcohols. The polyfunctional alcohols used are, in particular, those having from 2 to 6 carbon atoms, preferably from 3 to 6 carbon atoms and particularly preferably from 3 to 5 carbon atoms. Examples are ethylene glycol, propylene glycol, diethylene glycol, dipropylene glycol, glycerol, butanediol. The hydroxyl number of the compounds of formula I containing active hydrogen is preferably >160 mg KOH/g.

The polyesterols used according to the present invention are used, in particular, in an amount of from 1 to 5% by weight, preferably from 5 to 25% by weight, based on the total amount of the components a) to c).

The preparation of such compounds is described, for example, in DE-A-44 18 993.

The emulsions of the present invention are stable on storage for a number of weeks.

To produce fine-celled rigid polyurethane foams, the blowing agent-containing emulsions of the present invention are reacted with polyisocyanates. Isocyanates used are the customary and known aliphatic and in particular aromatic isocyanates, for example hexamethylene diisocyanate, isophorone diisocyanate, tolylene diisocyanate (TDI), diphenylmethane diisocyanate (MDI). For producing rigid polyurethane foam, preference is given to using mixtures of diphenylmethane diisocyanate and polyphenylpolymethylene polyisocyanates, also known as crude MDI.

The polyisocyanates can also be modified, for example by allophanate, biuret, isocyanurate or oxazolidine groups.

The polyurethanes are usually produced by mixing the emulsions of the present invention with the polyisocycanates, preferably in mixing heads, and curing the reaction mixture in open or closed molds.

The rigid polyurethane foams produced in this way have very fine and mostly open cells. They can be used in all application areas for such produces. Their use as core material for vacuum insulation elements is particularly advantageous.

The following details may be provided regarding the components of the emulsions of the present invention:

a) As compounds which contain at least two isocyanate-reactive hydrogen atoms and can be used together with the emulsification aids of formula I employed according to the present invention, it is possible to use compounds which have two or more reactive groups selected from among OH groups, SH groups, NH groups, NH$_2$ groups and CH-acid groups, eg. β-diketo groups, in the molecule.

Use is advantageously made of those having a functionality of from 2 to 8, preferably from 2 to 6, and a molecular weight of from 300 to 8000, preferably from 400 to 4000. Compounds which have been found to be useful are, for example, polyetherpolyamines and/or preferably polyols selected from the group consisting of polyether polyols, polyester polyols, polythioether polyols, polyesteramides, hydroxyl-containing polyacetals and hydroxyl-containing aliphatic polycarbonates or mixtures of at least two of the polyols mentioned. Preference is given to using polyester polyols and/or polyether polyols. The hydroxyl number of these polyhydroxy compounds is generally from 100 to 850 and preferably from 200 to 600.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. These dicarboxylic acids can be used either individually or in admixture with one another. In place of the free dicarboxylic acids, it is also possible to use the corresponding dicarboxylic acid derivatives such as dicarboxylic esters of alcohols having from 1 to 4 carbon atoms or dicarboxylic anhydrides. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane.

To prepare the polyester polyols, the organic, eg. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas such as nitrogen, carbon monoxide, helium, argon, etc., in the melt at from 150 to 250° C., preferably from 180 to 220° C., under atmospheric pressure or under reduced pressure to the desired acid number which is advantageously less than 10, preferably less than 2.

To prepare the polyester polyols, the organic polycarboxylic acids and/or derivatives and polyhydric alcohols are advantageously polycondensed in a molar ratio of 1:1–1.8, preferably 1:1.05–1.2.

The polyester polyols obtained preferably have a functionality of from 2 to 4, in particular from 2 to 3, and a molecular weight of from 300 to 3000, preferably from 350 to 2000 and in particular from 400 to 600.

However, the polyols used are particularly preferably polyether polyols which are prepared by known methods, for example from one or more alkylene oxides having from 2 to 4 carbon atoms in the alkylene radical by anionic polymerization using alkali metal hydroxides such as sodium hydroxide or potassium hydroxide or alkali metal alkoxides such as sodium methoxide, sodium or potassium ethoxide or potassium isopropoxide as catalysts with addition of at least one initiator molecule containing from 2 to 8, preferably from 2 to 6, reactive hydrogen atoms in bound form, or by cationic polymerization using Lewis acids such as antimony pentachloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Examples of suitable initiator molecules are: water, organic dicarboxylic acids such as succinic acid, adipic acid, phthalic acid and terephthalic acid, aliphatic and aromatic, unalkylated, N-monoalkylated, N,N- and N,N'-dialkylated diamines having from 1 to 4 carbon atoms in the alkyl radical, for example unalkylated, monoalkylated and dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine.

Further suitable initiator molecules are: alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using polyhydric, in particular dihydric, trihydric and/or higher-hydric alcohols such as ethanediol, 1,2- and 1,3-propanediol, diethylene glycol, dipropylene glycol, 1,4-butanediol, 1,6-hexanediol, glycerol, trimethylolpropane, pentaerythritol and sucrose.

The polyether polyols, preferably polyoxypropylene polyols and polyoxypropylene-polyoxyethylene polyols, have a functionality of preferably from 2 to 6 and in particular from 2 to 4 and molecular weights of from 300 to 8000, preferably from 400 to 1500 and in particular from 420 to 1100 and suitable polyoxytetramethylene glycols have a molecular weight up to about 3500.

Also suitable as polyether polyols are polymer-modified polyether polyols, preferably graft polyether polyols, in particular those based on styrene and/or acrylonitrile, which are prepared by in situ polymerization of acrylonitrile, styrene or preferably mixtures of styrene and acrylonitrile, eg. in a weight ratio of from 90:10 to 10:90, preferably from 70:30 to 30:70, advantageously in the abovementioned polyether polyols using methods similar to those given in the German Patents 11 11 394, 12 22 669 (U.S. Pat. Nos. 3,304,273, 3,383,351, 3,523,093), 11 52 536 (GB 10 40 452) and 11 52 537 (GB 987 618), and also polyether polyol dispersions which contain as disperse phase, usually in an amount of from 1 to 50% by weight, preferably from 2 to 25% by weight: eg. polyureas, polyhydrazides, polyurethanes containing bound tertiary amino groups and/or melamine, and are described, for example, in EP-B-011 752 (U.S. Pat. No. 4,304,708), U.S. Pat. No. 4,374,209 and DE-A-32 31 497.

Like the polyester polyols, the polyether polyols can be used individually or in the form of mixtures. They can also be mixed with the graft polyether polyols or polyester polyols or with the hydroxyl-containing polyester amides, polyacetals, polycarbonates and/or polyether polyamines.

Suitable hydroxyl-containing polyacetals are, for example, the compounds which can be prepared from glycols such as diethylene glycol, triethylene glycol, 4,4,-dihydroxyethoxydiphenyldimethylmethane, or hexanediol and formaldehyde. Suitable polyacetals can also be prepared by polymerization of cyclic acetals.

Suitable hydroxyl-containing polycarbonates are those of the type known per se, which can be prepared, for example, by reacting diols such as 1,3-propanediol, 1,4-butanediol and/or 1,6-hexanediol, diethylene glycol, triethylene glycol or tetraethylene glycol with diaryl carbonates, eg. diphenyl carbonate, or phosgene.

The polyester amides include, for example, the predominantly linear condensates obtained from polybasic, saturated and/or unsaturated carboxylic acids or their anhydrides and polyfunctional saturated and/or unsaturated aminoalcohols or mixtures of polyfunctional alcohols and aminoalcohols and/or polyamines.

Suitable polyetherpolyamines can be prepared from the abovementioned polyether polyols by known methods. Examples which may be mentioned are cyanoalkylation of polyoxyalkylene polyols and subsequent hydrogenation of the nitrile formed (U.S. Pat. No. 3,267,050) or partial or complete amination of polyoxyalkylene polyols using amines or ammonia in the presence of hydrogen and catalysts (DE 12 15 373).

The compounds containing at least two active hydrogen atoms (a) can also include chain extenders and/or crosslinkers. The addition of chain extenders, crosslinkers or, if desired, mixtures thereof can prove to be advantageous for modifying the mechanical properties of the resulting polyurethanes, eg. the hardness. Chain extenders and/or crosslinkers used are diols and/or triols having molecular weights of less than 400, preferably from 60 to 300. Suitable chain extenders/crosslinkers are, for example, aliphatic, cycloaliphatic and/or araliphatic diols having from 2 to 14, preferably from 4 to 10, carbon atoms, eg. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- or 1,3,5-trihydroxycyclohexane, glycerol and trimethylolpropane, and low molecular weight hydroxyl-containing polyalkylene oxides based on ethylene oxide and/or 1,2-propylene oxide and the abovementioned diols and/or triols as initiator molecules.

If chain extenders, crosslinkers or mixtures thereof are employed for producing the rigid foams based on isocyanate, they are advantageously used in an amount up to 20% by weight, preferably from 2 to 8% by weight, based on the weight of the component (a).

b) As blowing agent, preference is given to using water which eliminates carbon dioxide by reaction with the isocyanate group. The water content is, in particular, from 0.1 to 4% by weight, preferably from 0.3 to 3% by weight, in particular from 0.5 to 2% by weight, based on the total mass of all hydrogen-active compounds. An excessively high water content can lead to increased brittleness and thermal conductivity of the foam.

In addition to water, it is also possible to use physically acting blowing agents. In particular, use is made of low-boiling hydrocarbons, lower monofunctional alcohols, acetals or partially halogenated hydrocarbons, known as HCFCs. Preference is given to low-boiling cyclic and acyclic saturated hydrocarbons having up to 12 carbon atoms, which can be used individually or in any mixtures with one another, in particular pentanes, where either mixtures of the pentane isomers or the pure isomers can be used. The amount of the hydrocarbons is from 1 to 30 parts by weight, preferably from 16 to 22 parts by weight, in particular from 6 to 12 parts by weight, based on the weight of all hydrogen-active compounds.

Furthermore, the use of perfluorinated compounds as co-blowing agents is advantageous for certain applications. In particular, use is made of perfluoroalkanes, preferably n-perfluoropentane, n-perfluoroheptane, n-perfluorooctane. The perfluorinated compounds can be used individually or in the form of mixtures. They are preferably used in an amount of from 0.1 to 6 parts by weight, based on the sum of the components b) to d).

Since the perfluorinated compounds are insoluble in the polyol component, they are usually emulsified in this component. As emulsifiers, preference is given to using (meth) acrylates, in particular those having fluorine-containing side chains, for example fluorinated alkyl esters.

c) The emulsions of the present invention further comprise components important for producing the rigid polyurethane foams, eg. catalysts, auxiliaries and additives.

Catalysts employed are, in particular, those compounds which strongly accelerate the reaction of the compounds (a) containing reactive hydrogen atoms with the polyisocyanates. Preference is given to tertiary amines, tin and bismuth compounds, alkali metal and alkaline earth metal carboxylates, quaternary ammonium salts, s-hydroxytriazines and tris(dialkylaminomethyl)phenols.

Particular preference is given to tertiary aminoalcohols of the formula $$R_1R_2NR_3OH,$$

where $R_1$ and $R_2$ are aliphatic or cycloaliphatic groups having from 1 to 15 carbon atoms or $R_1$ and $R_2$ together form a single cycloaliphatic ring having from 3 to 15 carbon atoms and the nitrogen atom in the ring and $R_3$ is an aliphatic chain having from 1 to 15 carbon atoms.

The carbon chains or rings of $R_1$, $R_2$ and $R_3$ can also contain heteroatoms such as sulfur or in particular oxygen atoms in the chain.

Preferably, $R_1$ and $R_2$ together with the nitrogen atom form a piperidine, pyrrolidine, imidazole or morpholine structure, an alkaloid of the pyrrolidine/piperidine type or a bicyclic compound, eg. an azanorbornane.

An example which may be mentioned is the compound

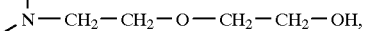

as is marketed by Air Products.

To form isocyanurate structures in the foam, use is made of the catalysts customary for this purpose, for example metal carboxylates such as potassium acetate and other substances as are described, for example, in the Kunststoff-Handbuch, Volume VII, Polyurethane, 3rd Edition 1993, page 108.

The catalysts are preferably employed in an amount of from 0.1 to 10 parts by weight based on 100 parts by weight of the compounds a), b) and c).

Further auxiliaries and additives are, for example, surface-active substances, foam stabilizers, cell regulators, flame retardants, fillers and hydrolysis inhibitors.

Further details regarding the abovementioned and further starting materials may be found in the specialist literature, for example the monograph by H. J. Saunders and K. C. Frisch, "High Polymers", Volume XVI, Polyurethanes, Parts 1 and 2, Interscience Publishers 1962 and 1964 or the Kunststoffhandbuch, Volume VII, Polyurethane, Carl Hanser Verlag, Munich, Vienna, 1st, 2nd and 3rd Editions, 1966, 1983 and 1993.

For cost reasons, perfluorinated blowing agents are preferably used only when they can be recovered in the production process. This is the case, for example, in the production of vacuum panels where the foam is evacuated before being welded into a gastight covering.

If hydrocarbons alone are used as physical blowing agents, particularly stable dispersions are obtained when the component a) comprises polyether alcohols which have a functionality of greater than 1.5, preferably from 2.5 to 3.5, and a hydroxyl number of from 10 to 100 mg/KOH/g, preferably from 25 to 50 mg KOH/g. These polyether alcohols are, in particular, used in an amount of from 1 to 50% by weight.

If only water is used as blowing agent, the emulsions are prepared by simple mixing of the components a) to c).

Although the emulsions have, as described, a very long shelf life, it may be found to be advantageous to generate them only just before foaming, for example in the mixing head of the foaming machine.

The emulsions of the present invention mostly have the appearance of milky, turbid liquids, but they can also appear transparent to the naked eye.

The invention is illustrated by the following examples.
Raw Materials Used
Polyols
Polyol 1
Polyether alcohol prepared from 25.2 parts of sorbitol and 74.8 parts of propylene oxide using KOH as catalyst and 0.5 parts of water as co-initiator. The hydroxyl number (OH number or OHN) is 495 mg KOH/g, the viscosity at 20° C. is 17,900 mPas.
Functionality: 5.
Polyol 2
Polyether alcohol prepared from sucrose/glycerol/water and propylene oxide, hydroxyl number 490 mg KOH/g, viscosity at 20° C. 8000 mPas, functionality 4.3.
Polyol 3
Polyether alcohol prepared from sucrose (1 part), pentaerythritol (1 part), diethylene glycol (2 parts), water as co-initiator and propylene oxide using KOH as catalyst, hydroxyl number 400 mg KOH/g, viscosity at 20° C. 2200 mPas.
Polyol 4
Polyether alcohol prepared from 28.0% of a mixture of 2,3- and 3,4-tolylenediamine, 22.0% of ethylene oxide and 50% of propylene oxide using KOH as catalyst. The OHN is 395 mg KOH/g, the viscosity at 20° C. is 8176 mPas.
Polyol 5
Polyester alcohol prepared from adipic acid/phthalic anhydride/oleic acid in a ratio of 1:2:1 and 1,1,1-trimethylolpropane to give a number average molar mass of 530 g/mol, a hydroxyl number of 385 mg KOH/g and a viscosity at 75° C. of 1370 mPas.
Polyol 5a
Polyester alcohol derived from glycerol and castor oil and having a hydroxyl number of 500 mg KOH/g.
Polyol 5b
Polyester alcohol derived from monoethylene glycol and tall oil fatty acid and having a hydroxyl number of 161 mg KOH/g.
Polyol 5c
Polyester alcohol derived from trimethylolpropane and tall oil fatty acid and having a hydroxyl number of 293 mg KOH/g.
Polyol 5d
Polyester alcohol derived from glycerol and tall oil fatty acid with a hydroxyl number of 310 mg KOH/g.
Polyol 5e
Polyester alcohol derived from glycerol and castor oil and having a hydroxyl number of 357 mg KOH/g.
Polyol 6
Prepared from glycerol as initiator using propylene oxide as first block and ethylene oxide as terminal block and having a hydroxyl number of 35 mg KOH/g and a viscosity of 850 mPas at 20° C. The mass ratio of propylene oxide is 6.4.
Polyol 7
Polyether polyol having a hydroxyl number of 470 mg KOH/g, a molecular weight of 470 and a functionality of 3.9, prepared by reacting ethylenediamine with propylene oxide.
Polyol 8
Polyether polyol having a hydroxyl number of 490 mg KOH/g, a molecular weight of 490 and a functionality of 4.3, prepared by reacting a mixture of sucrose, glycerol and water with propylene oxide.
Polyol 9
Polyether polyol having a hydroxyl number of 555 mg KOH/g and a functionality of 3.0, prepared by reacting trimethylolpropane with propylene oxide.

Polyol 10

Polyether polyol having a hydroxyl number of 400 mg KOH/g, a molecular weight of 420 and a functionality of 3.0, prepared by reacting glycerol with propylene oxide.

Isocyanate 1

Polyisocyanate, Lupranat® M 20 (BASF AG), a mixture of diphenylmethane diisocyanate and polyphenylpolymethylene polyisocyanates having an NCO content of 31.7% and a viscosity of 209 mPas at 25° C.

Isocyanate 2

Polyisocyanat, Lupranat® M 50 (BASF AG), a mixture of diphenylmethane diisocyanate and polyphenylpolymethylene polyisocyanates having an NCO content of 31.5% and a viscosity of 550 mPas at 25° C.

Experimental Procedure

Assessment of the Stability of the Emulsion 160 ml of the emulsion are poured into a test-tube having a diameter of 3.0 cm and a height of 20 cm, the test-tube is closed with a stopper and is allowed to stand at room temperature. The formation of any separate phases is observed as a function of time.

Production and Testing of the Rigid Polyurethane or Polyurethane/Polyisocyanurate Foams Foaming in a Cup A and B components are thermostatted at 20° C.±0.5 K. 240 g of the A and B components are mixed for 10 seconds at 1750 rpm in a cardboard cup having a capacity of about 660 ml using a laboratory stirrer from Vollrath, diameter 65 mm. The ratio of A to B corresponds to the respective formulation. The A component is a premix of the polyols used, auxiliaries and the blowing agent, while the B component consists of the polyisocyanate. Cream time, rise time and fiber time are measured in a known manner on the rising foam and the foam density, also referred to as density in the tables, is measured in a known manner on the cured foam. The fineness of the cells was compared visually and estimated as "fine-celled" (FC) or "very fine-celled" (VFC). Comparison with microscopic measurements shows that the cell diameter for "FC" is from 300 μm to 400 μm and for "VFC" is less than 250 μm. Particularly fine-celled (PFC) foams have a cell diameter of less than 180 μm.

Production of Rigid Foam Moldings and Their Testing

Mixing is carried out using a PUROMAT® HD 30 high-pressure foaming machine from ELASTOGRAN. Other machines are indicated separately.

The mixing ratio is set in accordance with the formulation.

Predominantly Closed-Celled Foams 576 g of the mixture of A component and isocyanate leaving the mixing head are poured into a mold which has the dimensions 300 mm×400 mm×80 mm (9.6 l mold) and is heated to 45° C., and the mold is subsequently closed tightly. The foam is formed with a compaction of from 1.1 to 2.0. The overall density of the molding is then 60±1 kg/m³. In other variants, an overall density of 70±1 kg/m³ or 80±1 kg/m³ was set by weighing 672 g or 768 g of the foaming mixture into the same mold, with the compaction being from 1.5 to 2. The NCO index, viz. the molar ratio of NCO to hydrogen-active groups, and the fiber time were kept constant for comparative examples and examples according to the present invention.

After a demolding time of 30 minutes, test specimens were sawn from the interior of the foam block after 24 hours in order to measure the thermal conductivity and the heat distortion resistance.

The thermal conductivity at room temperature was measured using an ANACON Model 88 instrument from Anacon, St. Peters Road, Maidenhead, Berkshire, England at a mean temperature of 23.9° C. (gradient 37.7° C./10° C.) and the thermal conductivity at elevated temperature was measured using a Rapid-k VT 400 instrument from Holometrix Inc., Boston, U.S.A. In this measurement, the temperature gradient can be varied within wide limits and is also indicated in the tables.

The thermal conductivity was measured 24 hours after foaming (storage at room temperature) and also after storage open to diffusion at 80° C. for 120 hours.

The heat distortion resistance was measured as percent deformation on a few specimens in accordance with DIN 18164 having dimensions of 50 mm×50 mm×50 mm after loading at 0.04 N/mm² for 24 hours. The test temperatures are indicated in the tables.

For some PUR/PIR formulations, 2.5 liter aluminum pressure flasks are charged with 250 g of the foaming mixture (corresponds to an overall density of 100 kg/M³), closed tightly and stored at 200° C. for 4 weeks, in some cases at 220° C. for 2 weeks (flask test). The foam is then assessed visually. In manual foaming tests similar to foaming in a cup, correspondingly smaller Al flasks having a volume of 0.5 l were used with 50 g of mixture.

Largely Open-Celled Foams

Foaming in a Cup

The polyol component A and the isocyanate component B are thermostatted to 20° C.±0.5 K. 80 g of the A and B components are mixed for 10 seconds at 1750 rpm in a cup having a capacity of 1100 ml using a laboratory stirrer from Vollrath, diameter 65 mm. Cream time, rise time and fiber time are determined on the rising foam and, after cutting off the cap, the free-foamed density is determined.

Foaming by Machine

Polyol and isocyanate components were mixed in the mixing head of a PURONAT® SV 20 high-pressure foaming machine from ELASTOGRAN and introduced into an open mold having dimensions of 700 mm×400 mm×90 mm. After closing the mold, the mixtures were allowed to foam. Test specimens without compaction and with compaction, eg. 1.1 or 1.2, can be produced. Shaped specimens for determining open cell content, cell fineness, compressive strength, E moduli, foam density and dimensional stability can be made from the foam blocks.

In addition, test specimens having dimensions of 190 mm×190 mm×20 mm were sawn from the foam blocks, pretreated for two hours at 110° C. and atmospheric or subatmospheric pressure and subsequently packed in a gastight film bag and the latter was evacuated to final pressures of 0.05 mbar and welded shut.

The thermal conductivity was then determined in accordance with DIN 52616 on a Hest Lambda Control A-50 instrument. The open cell content was determined in accordance with AST MD 28 56-87, method B, on an Accupyc 1330.

In the following tables, the results of the foaming tests in accordance with the present invention are compared with examples which are not according to the present invention:

| | Examples 1 and 2 | | |
|---|---|---|---|
| Number | 1 Comparison | 1a Comparison | According to the present invention |
| polyol 5 | | | 25.61 |
| polyol 1 | 25.61 | 57.22 | |
| polyol 6 | 31.61 | | 31.61 |
| dipropylene glycol | 16.65 | 16.65 | 16.65 |
| ethylene glycol | 2.72 | 2.72 | 2.72 |
| stabilizer mixture | 2.56 | 2.56 | 2.56 |
| water | 0.38 | 0.38 | 0.38 |
| potassium acetate | 2.41 | 2.41 | 2.41 |

-continued

| | | | |
|---|---|---|---|
| tertiary amine | 0.26 | 0.26 | 0.26 |
| cyclopentane | 17.80 | 17.80 | 17.80 |
| total | 100.00 | 100.00 | 100.00 |
| isocyanate 1 | 300 | 300 | 300 |
| cream time (s) | 18 | 18 | 18 |
| fiber time (s) | 29 | 29 | 29 |
| rise time (s) | 43 | 43 | 43 |
| foam density kg/m$^3$ | 64.9 | 64.9 | 64.9 |
| closed cell content (%) | >90 | >90 | >90 |
| stability of emulsion | | | |
| immediate | E | E | E |
| after 4h | E | E | E |
| after 1 day | PP | PP | E |
| after 7 days | PC | PC | E |
| after 3 weeks | PC | PC | E |
| after 2 months | PC | PC | E |
| foam structure | FC | FC | PFC |

E = emulsion without phase separation,
PP = phase separation, partial,
PC = phase separation, complete,
FC = fine-celled,
VFC = very fine-celled according to visual estimation. Reaction times in the freshly emuisified state.

Examples 3 to 6

| Number | 3 Comparison | 4 According to the present invention | 5 According to the present invention | 6 According to the present invention |
|---|---|---|---|---|
| polyol 5 | 31.14 | 31.14 | 31.14 | |
| polyol 5a | | | | 31.14 |
| polyol 6 | 38.47 | 38.47 | 38.47 | 38.47 |
| dipropylene glycol | 20.25 | 20.25 | 20.25 | 20.25 |
| ethyiene glycol | 3.30 | 3.30 | 3.30 | 3.30 |
| stabilizer mixture | 3.12 | 3.12 | 3.12 | 3.12 |
| water | 0.47 | 0.47 | 0.47 | 0.47 |
| potassium acetate | 2.93 | 2.93 | 2.93 | 2.93 |
| tertiary amine | 0.32 | 0.32 | 0.32 | 0.32 |
| total | 100.00 | 100.00 | 100.00 | 100.00 |
| R11 | 56.3 | | | |
| isopentane | | 17.0 | | |
| cyclopentane | | | 17.0 | 17.0 |
| isocyanate 1 | 390 | 390 | 390 | 390 |
| cream time (s) | 17 | 13 | | 18 |
| fiber time (s) | 39 | 39 | | 36 |
| foam density kg/m$^3$ | 51 | 52 | | 70 |
| closed cell content | >90 | >90 | >90 | >90 |
| thermal conductivity in mW/mK at 23° C. 7 days | 18.4 | 19.9 | 19.9 | 20.0 |
| stability of emulsion | | | | |
| immediate | E | E | E | E |
| after 4h | E | E | E | E |
| after 1 day | PP | E | E | E |
| after 7 days | PC | E | E | E |
| foam structure | FC | FC | PFC | PFC |
| flask test | foam black | foam light-colored | foam light-colored | |

-continued

| | | |
|---|---|---|
| 2 weeks, 200° C. | destroyed | firm, 1 crack | firm |

E = emulsion without phase separation,
PP = phase separation, partial,
PC = phase separation, complete,
FC = fine-celled,
VFC = very fine-celled according to visual estimation. Reaction times in the freshly emulsified state.

Examples 7 and 8

| Number | 7 According to the present invention | 8 According to the present invention |
|---|---|---|
| polyol 5 | 25.61 | 25.61 |
| polyol 6 | 31.62 | 31.62 |
| dipropylene glycol | 16.65 | 16.65 |
| ethylene glycol | 2.71 | 2.71 |
| stabilizer mixture | 2.56 | 2.56 |
| water | 0.38 | 0.38 |
| potassium acetate | 2.41 | 2.41 |
| tertiary amine | 0.26 | 0.26 |
| cyclopentane | 17.80 | 17.80 |
| total | 100.00 | 100.00 |
| TEP | 0 | 11.5 |
| isocyanate 2 | 320 | 322 |
| B 2 Test DIN 4102 | >19 cm/B3 | 12.5 cm/B2 |
| closed cell content | >90 | >90 |
| stability of emulsion | | |
| immediate | E | E |
| after 4h | E | E |
| after 1 day | E | E |
| after 7 days | E | E |

E = emulsion without phase separation
TEP = triethyl phosphate

| Polyol component | Example 9 (C) | Example 10 (according to the present invention) | Example 11 (according to the present invention) |
|---|---|---|---|
| polyol 7 | 20 | 20 | 20 |
| polyol 8 | 30 | 20 | 40 |
| polyol 9 | 50 | 50 | 30 |
| polyol 5a | | 10 | 10 |
| B8919 | 3 | 3 | 3 |
| B8863Z | 1 | 1 | 1 |
| FC 430 | 1 | | 1 |
| Dabco AN 20 | 5 | 5 | 5 |
| water | 0.5 | 2.3 | 0.5 |
| cyclopentane | 7 | | 7 |
| perfluorohexane | 4 | | 4 |
| isocyanate 1 | 144 | 145 | 147 |
| density (g/l) | 55.3 | 54.7 | 55.0 |
| open cell content (%) | 83 | 100 | 100 |
| thermal conductivity in mW/mK at 0.1 mbar | 13 | 7.5 | 7.0 |
| stability of emulsion | | | |
| immediate | E | | |
| after 4h | E | E | E |

-continued

| | | | |
|---|---|---|---|
| after 1 day | PP | E | E |
| after 7 days | PC | E | E |

C = comparative example,
E = emulsion without phase separation,
PP = phase separation, partial,
PC = phase separation, complete.

| polyol component | Example 12 (according to the present invention) | Example 13 (according to the present invention) | Example 14 (according to the present invention) | Example 15 (according to the present invention) |
|---|---|---|---|---|
| polyol 7 | 15 | 15 | 15 | 10 |
| polyol 8 | 17.5 | 22.5 | 20 | 10 |
| polyol 9 | 41 | 36 | 40 | 43 |
| polyol 5d | 5 | | | 14 |
| polyol 5b | | | 5 | |
| polyol 5c | | | | |
| B8919 | 3 | 3 | 3 | 4.5 |
| B8863Z | 1 | 1 | 1 | 1.4 |
| FC 430 | 1 | 1 | 1 | |
| Dabco AN 20 | 5 | 5 | 5 | 2.8 |
| water | 0.5 | 0.5 | 0.5 | 2.2 |
| cyclopentane | 7 | 7 | 7 | |
| perfluorohexane | 4 | 4 | 4 | |
| isocyanate 1 | 117 | 116 | 149 | 180 |
| density (g/l) | 55 | 52 | 53 | 55 |
| open cell content (%) | 95 | 71 | 73 | 96 |
| thermal conductivity in mW/m*K | 7.5 | 14 | 13 | 6.9 |
| stability of emulsion | | | | |
| immediate | E | E | E | E |
| after 4h | E | E | E | E |
| after 1 day | E | E | E | E |
| after 7 days | E | E | E | E |

C = comparative example,
E = emulsion without phase separation,
PP = phase separation, partial,
PC = phase separation, complete.

| polyol component | Example 16 (according to the present invention) | Example 17 (according to the present invention) | Example 18 (according to the present invention) | Example 19 (according to the present invention) |
|---|---|---|---|---|
| polyol 7 | 10 | 10 | 10 | 10 |
| polyol 8 | 10 | 10 | 10 | 10 |
| polyol 9 | 43 | 43 | 43 | 43 |
| polyol 5e | 12 | 12 | 12 | 12 |
| polyol 10 | 20 | 20 | 20 | 20 |
| Ortegol 501 | | 3.6 | 3.6 | |
| B 8919 | 3.6 | | | 3.6 |
| B 8870 | 1 | 0.8 | | 1.4 |
| B 8863 Z | | | 1.4 | |
| Dabco AN 20 | 3 | 3 | 3 | 3 |
| water | 2.5 | 2.3 | 2.3 | 2.3 |
| isocyanate 1 | 190 | 190 | 190 | 190 |
| density (g/l) | 59 | 58 | 59 | 60 |
| open cell content (%) | 96 | 96 | 95 | 96 |
| thermal conductivity in mW/m*K | 7.8 | 7.5 | 8.1 | 7.3 |
| stability of emulsion | | | | |
| immediate | E | E | E | E |
| after 4h | E | E | E | E |
| after 1 day * | E | E | E | E |
| after 7 days | E | E | E | E |

C = comparative example,
E = emulsion without phase separation,
PP = phase separation, partial
PC = phase separation, complete

| polyol component | Example 20 (according to the present invention) | Example 21 (according to the present invention) | Example 22 (according to the present invention) |
|---|---|---|---|
| polyol 5 | 26 | 26 | 26 |
| polyol 6 | 32 | 32 | 32 |
| dipropylene glycol | 17 | 17 | 17 |
| B 8461 | 1.3 | 1.3 | 1.3 |
| B 8409 | 1.3 | 1.3 | 1.3 |
| B 8919 | | 2 | |
| UAX 6164 | | | 2 |
| water | 0.4 | 0.4 | 0.4 |
| Lupragen VP 9104 | 5.1 | 5.1 | 5.1 |
| Lupragen N 301 | 0.3 | 0.3 | 0.3 |
| cyclopentane | 18 | 18 | 18 |
| isocyanate 2 | 320 | 320 | 320 |
| density (g/l) | 65 | 64 | 61 |
| open cell content (%) | 3.2 | 95.6 | 92.4 |
| thermal conductivity in mW/m*K at 0.1 mbar | 31 | 6.9 | 8.1 |
| stability of emulsion | | | |
| immediate | E | E | E |
| after 4h | E | E | E |
| after 1 day | E | E | E |
| after 7 days | E | E | E |

C = comparative example,
E = emulsion without phase separation,
PP = phase separation, partial,
PC = phase separation, complete.

We claim:

1. A blowing agent-containing emulsion comprising a) compounds containing hydrogen atoms which are reactive toward isocyanates, b) blowing agents, c) catalysts, auxiliaries and additives, wherein the blowing agents b) are present as an emulsion in the components a) and c), and d) polyester alcohols having the following structure:

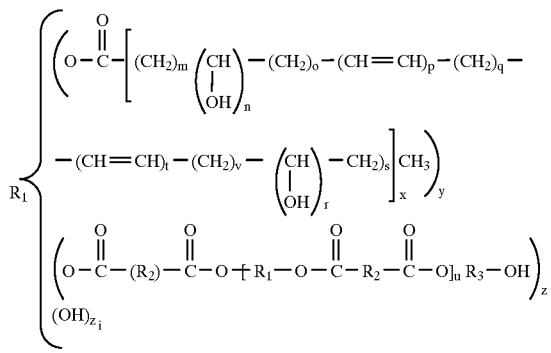

where
- m=0–15
- n=0–1
- o=0–15
- p=0–1
- q=0–15
- r=0–1
- s=0–15
- t=0–1
- u=0–10
- v=0–15
- x=1–5
- y=1–4 or mixtures of 1–3 where r+n≠0
- z=0–3
- $z_i$=0.1–3

$R^1$ is an aliphatic structure without OH groups based on the structure of polyhydric alcohols, or a mixture of the corresponding structures, $R^2$ is the radical of a polycarboxylic acid without COOH groups, $R^3$ is an alcohol radical as described for, but independent of $R_1$.

2. A blowing agent-containing emulsion as claimed in claim 1, wherein the polyester alcohols comprise esterification products of naturally occurring substances and polyfunctional alcohols.

3. A blowing agent-containing emulsion as claimed in claim 1, wherein the emulsification aids having the structure I make up 0.1–80% by weight of the total compounds a).

4. A blowing agent-containing emulsion as claimed in claim 1, wherein the emulsification aids having the structure I make up 5–50% by weight of the total compounds a).

5. A blowing agent-containing emulsion as claimed in claim 1, wherein the emulsification aids having the structure I make up 10–20% by weight of the total compounds a).

6. A blowing agent-containing emulsion as claimed in claim 1, wherein the compounds a) containing hydrogen atoms which are reactive toward isocyanates comprise mixtures of compounds of the structure I with polyols having a functionality of greater than 1.5 and a hydroxyl number of from 10 mg KOH/g to 600 mg KOH/g.

7. A blowing agent-containing emulsion as claimed in claim 1, wherein the compounds containing hydrogen atoms which are reactive toward isocyanates comprising mixtures of compounds having the structure I and reaction products of trimethylolpropane and alkylene oxides.

8. A process for producing closed-celled or open-celled rigid polyurethane foams comprising reacting a blowing agent-containing emulsion as claimed in claim 1 with a polyisocyanate.

9. A blowing agent-containing emulsion as claimed in claim 1, wherein $R_1$ is selected from the group consisting of ethylene glycol, diethylene glycol, triethylene glycol, 1,2-propylene glycol and dipropylene glycol, 1,4-butanediol, 1,6-hexanediol, neopentyl glycol, 1,3-butanediol, trimethylolpropane, trimethylol ethane, glycerol, pentaerythritol and mixtures thereof.

10. A blowing agent-containing emulsion as claimed in claim 1, wherein $R_2$ is selected from the group consisting of adipic acid, terephthalic acid, o-phthalic acid and mixtures thereof.

* * * * *